United States Patent
Clark, Jr. et al.

[15] 3,666,918
[45] May 30, 1972

[54] ELECTRIC POWERED WATER HEATING SYSTEM

[72] Inventors: John A. Clark, Jr., East Stroudsburg; Lemuel J. Morgan, Stroudsburg, both of Pa.; Robert F. Kirschner, Stoughton, Mass.

[73] Assignee: The Patterson-Kelley Co., Inc., East Stroudsburg, Pa.

[22] Filed: Mar. 11, 1971

[21] Appl. No.: 123,198

Related U.S. Application Data

[63] Continuation-in-part of Ser. No. 28,355, Apr. 13, 1970.

[52] U.S. Cl. .................................. 219/314, 122/13 A
[51] Int. Cl. ............................................. F24h 1/20
[58] Field of Search .................. 219/312, 314, 316, 321; 165/108; 122/32, 13 A; 126/362

[56] References Cited

UNITED STATES PATENTS

| | | |
|---|---|---|
| 3,446,939 | 5/1969 | Morgan et al..........................219/316 |
| 2,879,749 | 3/1959 | Lewy..................................165/108 X |
| 3,597,589 | 8/1971 | Morgan.....................................219/321 |
| 3,351,739 | 11/1967 | Eckman....................................219/321 |
| 3,383,495 | 5/1968 | Laube et al.............................219/321 |

Primary Examiner—C. L. Albritton
Attorney—Bean & Bean

[57] ABSTRACT

A water heating system including a tank for storing heated water for withdrawal to a point of use and having a cold water inlet for replenishing withdrawn water; a conduit having an immersion heater therewithin, the conduit having a water intake manifold for delivering water from the tank to pass in heat exchange relation with the immersion heater and having a heated water outlet arranged in flow communication with the point of use, the manifold having openings arranged in flow communication with different levels within the tank at which levels different water temperatures may exist, whereby the temperature of water passing into heat exchange relationship with the heater is an integral of the temperatures of water from the different levels; and a temperature sensor for controlling the rate of heat input to water passing through the conduit as a function of the integral temperature.

36 Claims, 11 Drawing Figures

Patented May 30, 1972

INVENTORS
JOHN H. CLARK, JR.
LEMUEL J. MORGAN
ROBERT F. KIRSCHNER

BY Bean & Bean

ATTORNEYS

Patented May 30, 1972

INVENTORS
JOHN H. CLARK, JR.
LEMUEL J. MORGAN
ROBERT F. KIRSCHNER

BY
Bean & Bean
ATTORNEYS

Patented May 30, 1972

INVENTORS
JOHN H. CLARK, JR.
LEMUEL J. MORGAN
ROBERT F. KIRSCHNER

BY Bean & Bean
ATTORNEYS

INVENTORS
JOHN H. CLARK, JR.
LEMUEL J. MORGAN
ROBERT F. KIRSCHNER
BY
Bean & Bean
ATTORNEYS

3,666,918

ELECTRIC POWERED WATER HEATING SYSTEM

This application is a continuation-in-part of our prior application for an Electric Powered Water Heating System, Ser. No. 28,355, filed Apr. 13, 1970.

SUMMARY OF THE INVENTION

The present invention is directed to an improvement in water heating systems, whereby both improved temperature control and heater operating economies are achieved.

The present invention is principally described in connection with its use in a system, wherein a water heating and storage tank is provided with a cold water supply inlet for replenishing water withdrawn from the tank; water being heated prior to withdrawal during passage through a shrouded heat exchanger. A pump is connected into the discharge end of the heat exchanger and employed to normally circulate water from a lower level of the tank, through the heat exchanger and into an upper level of the tank in order to bring up and/or maintain water within the tank at a desired delivery temperature. The heat exchanger is in the form of a regulatable output heater whose operation is controlled by a temperature sensor arranged to sense the temperature of water passing from heat exchange association with the heater.

More specifically, the present invention relates to the utilization of a manifold for placing the inlet end of the heat exchanger in flow communication with different levels of the tank at which levels different water temperatures may exist due to either the temperature stratification phenomena normally present within the tank during a recovery period and/or turbulence conditions occasioned by the introduction of cold supply water into the tank during a heated water withdrawal period. The manifold therefore serves to supply the heat exchanger with water at a temperature which is an "integral" of the temperatures of water from such levels, and the temperature sensor serves to control the rate of heat transfer to the water passing through the heat exchanger as a function of such integral temperature.

In general, this blending of water at varying temperatures by the manifold tends to smooth out fluctuations in temperature of the water passed to the heater; thereby resulting in a reduction of the "instant load" required to be applied to the heater for all draw periods for which any given system is rated and/or preventing undesirable hunting or cycling of the temperature sensor and heater.

The utilization of the present system is particularly desirable when the heater is an electrically energizable heater of the type having a plurality of heating elements, which are controlled by a multi-stage thermostat for energization in a selectively progressive or step-wise manner. In this respect, the manifold dampens out variations in the temperature of the water passed to the heater so as to deliver water at some integral or averaged temperature, which is progressively reduced, or increased during withdrawal and recovery periods, respectively. This permits the heater elements to be energized in a selectively progressive manner with the result that heating of the water is accomplished at a more continuous rate and at a lower average power input level. Although for any given installation the amount of power used by a heating system employing the present invention will be substantially the same as a conventional heating system for any given 24-hour period, the power is used at a lower kilowatt input rate and consequently, at a substantially lower cost when billing is based on demand. Moreover, a reduced demand produces additional savings in the cost of electrical service, since the wires and transformer feeding the heater can be smaller and less expensive.

The present invention is also described in connection with other diverse types of water heating installations, wherein it possesses particular utility.

DRAWINGS

The nature and mode of the present invention will now be more fully described in the following detailed description taken with the accompanying drawings wherein.

DETAILED DESCRIPTION

Figure 1:
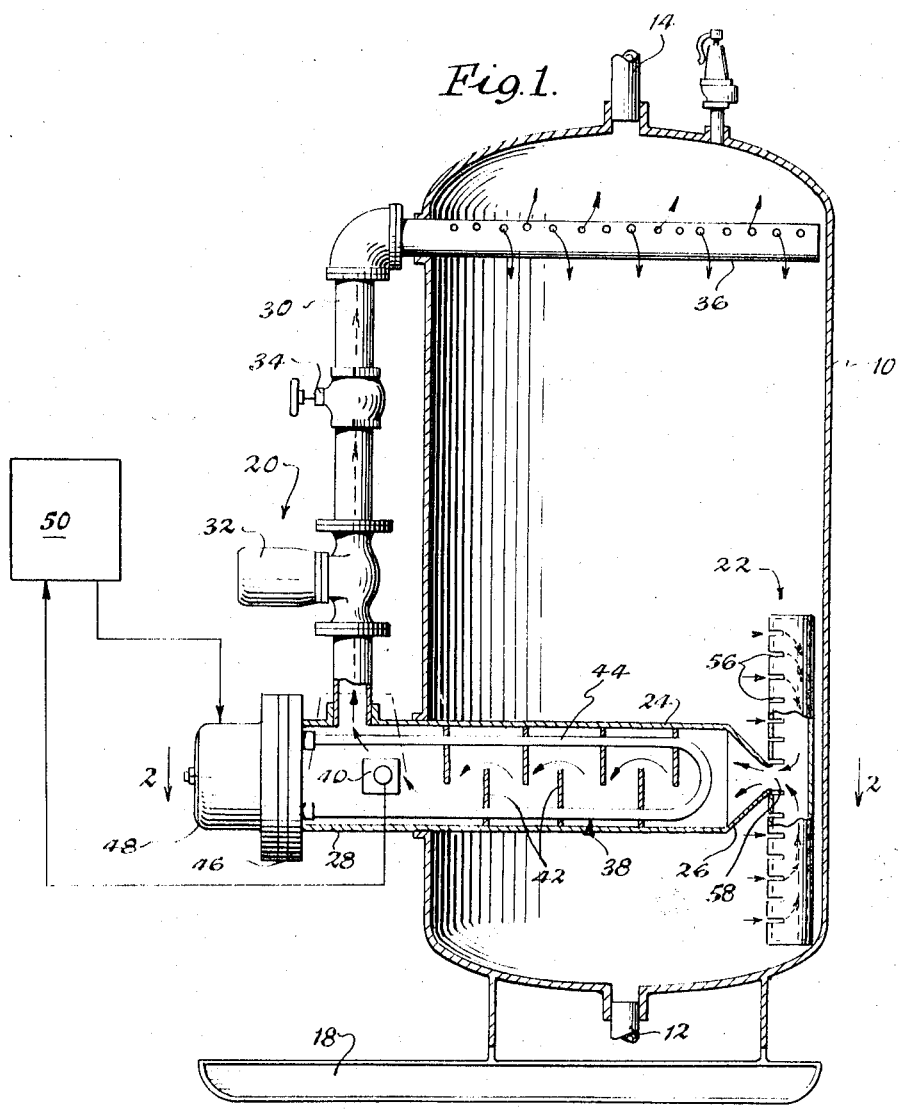
FIG. 1 is a vertical sectional view through a water heating and supply system formed in accordance with the preferred embodiment of the present invention.
Figure 2:
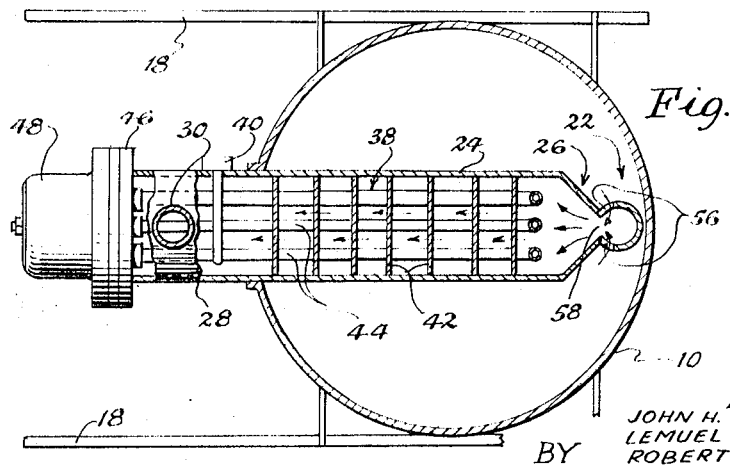
FIG. 2 is a horizontal sectional view taken generally along line 2—2 in FIG. 1.

As illustrated in FIGS. 1 and 2, the invention may be embodied in a heated water supply system including a heated water storage tank 10 having a cold water inlet connection 12 at the bottom level thereof for replenishing water withdrawn through a heated water outlet 14 arranged in the "ceiling" portion of the tank. Outlet 14 may be suitably connected to a point at which the heated water is to be used. The tank may of course be heat insulated and mounted on parallel skids 18 to facilitate transportation and the setting up of the tank.

In the arrangement illustrated in FIGS. 1 and 2, a circulation or conduit system, generally designated as 20, is provided for withdrawing water from a relatively lower region of tank 10, heating the withdrawn water and subsequently reintroducing the heated water into a relatively upper level or region of the tank in fluid communication with outlet 14, whereby the water within the tank is brought up to and/or maintained at a desired withdrawal temperature. During a recovery period, the tank is progressively filled with heated water from the top down, due to the natural water temperature stratification phenomena. The stratification of water by temperature is not disturbed due to the fact that system 20 introduces heated water into the upper relatively hot levels or region of the tank.

System 20 generally includes a water intake device in the form of a manifold 22; a substantially horizontally disposed shroud 24 having inlet and outlet end portions 26 and 28, which are arranged relatively inwardly and outwardly of tank 10, respectively; a conduit 30 which is connected into end portion 28 and has a normally running constant displacement pump 32 and an adjustable water flow rate modulating valve 34 arranged therein; and a distribution conduit or sparger pipe 36, which is in flow communication with the upper end of conduit 30 and arranged to distribute heated water adjacent the top of tank 10 in close proximity to tank outlet 14. By this arrangement, water heated to a desired delivery temperature is always available for withdrawal through outlet 14.

Arranged within shroud 24 is an immersion heater 38; a temperature sensing control bulb 40, which is positioned to sense the temperature of water passing from heat exchange association with heater 38; and a plurality of alternately disposed upwardly and downwardly directed baffle plates 42, which serve to force water passing through the shroud to travel in a vertically undulating or zig-zag path relative to heater 38.

Heater 38 is shown in FIGS. 1 and 2 as including a plurality of blade type heater elements 44, which extend through a header sheet 46 into a bonnet 48 for connection to power supply leads coming from a conveniently located control panel 50.

Sensor 40 is automatically responsive to temperature changes in the water passing from heater 38 and serves to adjust power to heater elements 44 as required to raise the temperature of such water to a prescribed operating or withdrawal level. Preferably, sensor 40 is a multi-stage thermostat, which effects energization of the heater elements in a selectively progressive or step-wise manner in order to vary the rate of heat transfer to the water passing through shroud 24.

Figure 11:
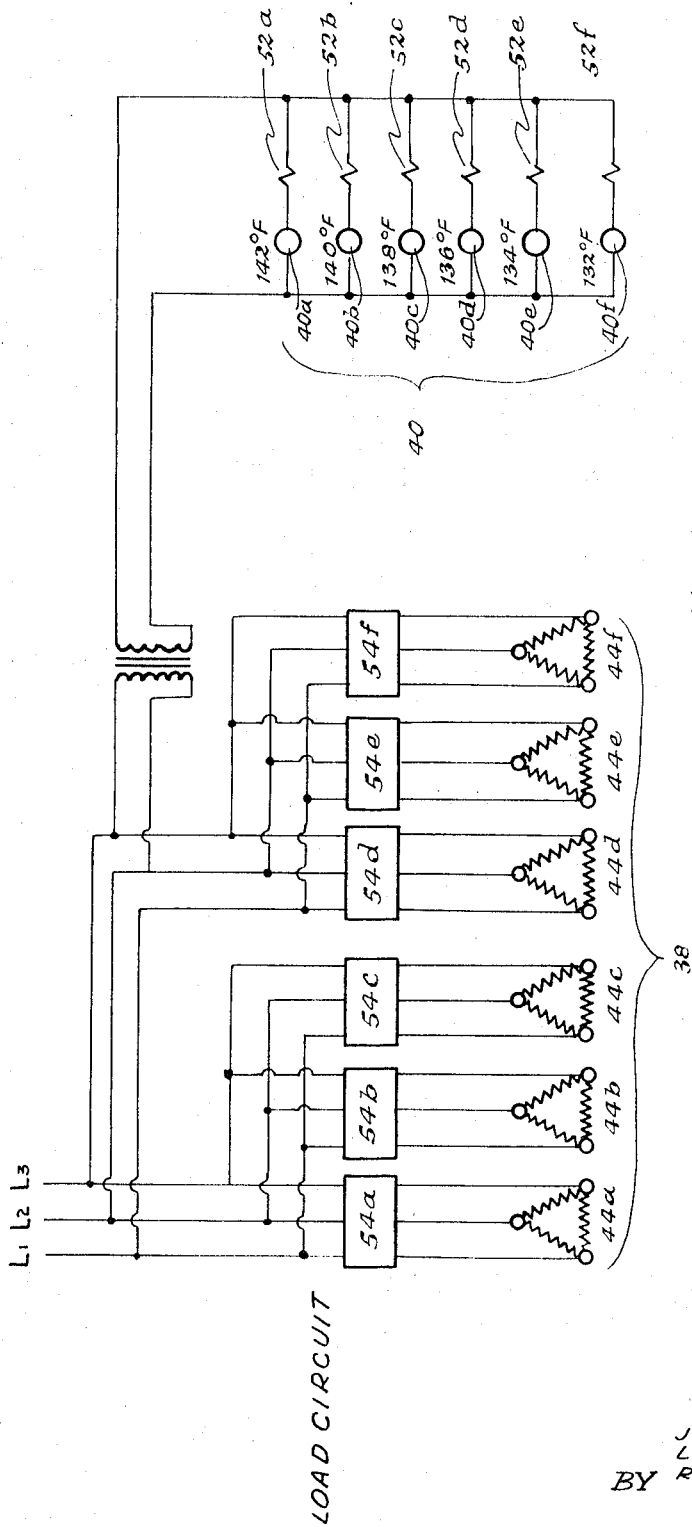
FIG. 11 is a schematic view illustrating the electrical control circuit for a water heater employed in the preferred embodiment of the present invention.

As by way of illustration, reference is made to FIG. 11, wherein sensor 40 is shown as including a suitable number of thermostat switch controls 40a–40f arranged in series with magnetic contactor actuators 52a–52f. Actuators 52a–52f serve to control operation of magnetic contactors 54a–54f arranged to control energization of heater elements 44a–44f comprising immersion heater 38. During normal operation, controls 40a–40f are set to complete a circuit through their associated actuator 52a–52f at differing temperatures below the prescribed operating temperature. In the arrangement illustrated, control 40a is set to complete a circuit through actuators 52a in order to effect energization of heater element 44a whenever the temperature of the water passing through the outlet end portion of shroud 24 drops below about 142°F; controls 40b–40f thereafter successively completing circuits through actuators 52b–52f for each 2° temperature drop until each of heating elements 44a–44f is energized when the temperature of the water falls to below about 132°F. As will be apparent, the number of heating elements employed in any given installation may differ from that illustrated, and single thermostat switch controls may be employed to simultaneously control energization of groups of heating elements. While undesirable, it is also possible to merely vary the flow of current to the heater elements.

Alternatively, sensor 40 may be employed to adjustably control valve 34 or to control operation of pump 32, if the latter is of the variable capacity variety, in order to vary the rate at which water flows through the conduit system and thus the rate of heat transfer to such water.

Preferably, heater elements 44 and baffles 42 are mounted on "header sheet" 46 in the manner described in U.S. Pat. No. 3,446,939 in order to permit the heater elements and baffles to be removed from shroud 24 as a single unit and the individual heater elements to be subsequently slipped from the baffles in order to facilitate replacement of such heating elements.

Manifold 22 is shown in FIG. 1 as being supported within tank 10 by shroud 24 and is extended vertically from adjacent shroud inlet end portion 26. Manifold 26 is preferably provided with a plurality of water inlet openings 56 arranged in spaced relationship substantially throughout the vertical extent thereof and a single outlet opening 58 adjacent the midpoint thereof, which is arranged in flow communication with inlet end portion 26. As will be appreciated, however, manifold 22 may be inclined relative to the position shown in FIG. 1, and the plural inlet openings may be replaced by a single elongated inlet opening arranged to take in water from plural levels within the tank.

Manifold 22 may be fabricated in any suitable manner, as from standard tubular stock, which has its ends sealed or open, as desired, and inlet openings 56 may be suitably formed as by a series of saw cuts or drilled or punched holes through the inwardly facing side wall of the tubular stock. Thus, it will be appreciated that operation of pump 32 will cause water to be sucked into manifold 22 through openings 56 from all levels within the tank that are within the elevational reaches of the manifold, and such water will be combined within the manifold for passage into heat exchange association with immersion heater 38. The amounts of water withdrawn from each of such levels may be equal or varied depending upon the relative size and placement of openings 56.

It will be understood that it is preferable for pump 32 and one or more of heater elements 44 to be continuously energized in order to continuously heat and circulate water between the lower and upper regions of tank 10, such that during a stand-by or recovery period the tank will be progressively filled with properly heated water from the top down. Until recovery is completed, that is, when all of the water within tank 10 has been brought up to substantially the desired operating temperature, the water at different levels within the tank will have different temperatures, due to the natural tendency of cold, relatively high density water to displace warm, relatively low density water. Water present at different levels within the tank may also vary substantially and irregularly in temperature during a draw period, due to the fact that the inrushing cold supply water tends to set up turbulence within the tank.

It will be understood that by taking in water from different levels within tank 10 at which levels water at different temperatures may exist, manifold 22 serves to pass water into heat exchange relationship with heater 38, which is at a temperature corresponding to an integral or average of the temperature of the water at such levels. By integrating or averaging the temperatures of water present within several levels within the tank, it is necessary to apply only a relatively low instant input load to heater 38 in order to bring the water being circulated up to the desired operating temperature. Further, by averaging the temperatures of water at different levels whereat severe turbulence may exist, there is negated the possibility that a cold slug or surge of hot water will be applied adjacent the outlet of tank 10 before sensor 40 has had an opportunity to respond and effect energization of an appropriate number of the heater elements.

The term "integral" or "average" as used herein, is not meant to necessarily imply the arithmetic mean of the temperatures present at the levels from which water is taken into the manifold. Rather, the integral or average of the temperatures may be "weighted" depending upon the physical configuration of the tank, the vertical extent of the manifold and/or desired thermal operating conditions.

Figure 3:
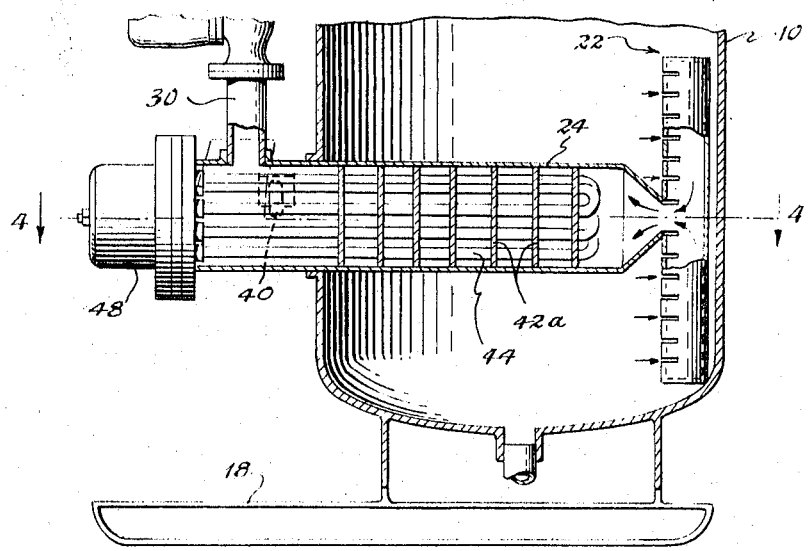
FIG. 3 is a view corresponding to a portion of FIG. 1, but showing a modified heating element and water flow guide baffle arrangement within the heater shroud.
Figure 4:
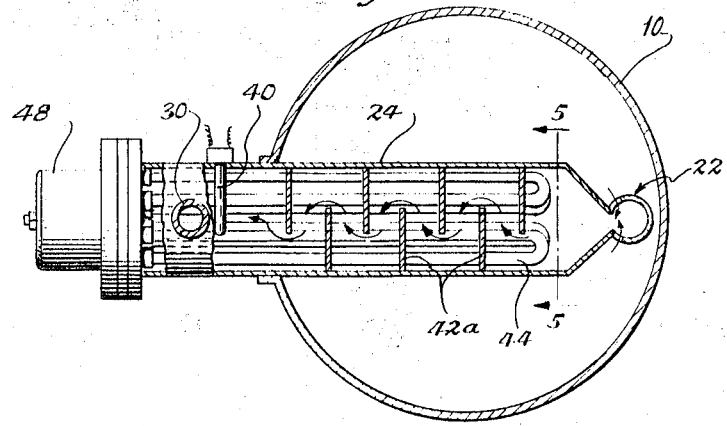
FIG. 4 is a view corresponding to FIG. 2, but taken generally along the line 4—4 in FIG. 3.
Figure 5:
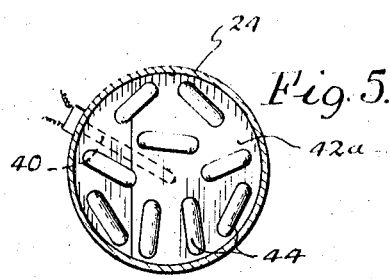
FIG. 5 is an enlarged scale sectional view taken generally along the line 5—5 in FIG. 4.

FIGS. 3–5 illustrate a modified form of the previously described baffle arrangement illustrated in FIGS. 1 and 2, wherein baffles 42a are disposed to stand vertically while extending alternately inwardly from opposite sides of the shell of heater shroud 24. This arrangement forces the water to follow a horizontal zig-zag path when traveling through the shroud, thereby attaining maximum heat exchange efficiency while avoiding deposition and/or accumulations of sediment inside the shroud.

Figure 6:
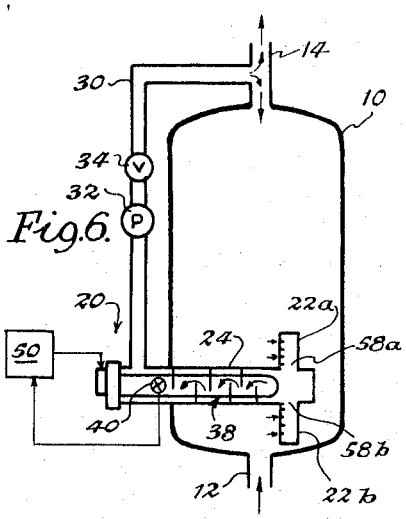
FIGS. 6–10 are views illustrating alternative forms of the present invention.

FIG. 6 illustrates a slightly modified form of the present invention, wherein the inner end of shroud 24 is closed, and a pair of manifolds 22a, 22b is connected in flow communication with shroud 24 by openings 58a, 58b arranged in upper and lower portions of cylindrical surface of the shroud. Further, in this form, the sparger pipe is omitted and conduit 30 connected directly into outlet 14 for flow communication with tank 10.

Figure 7:
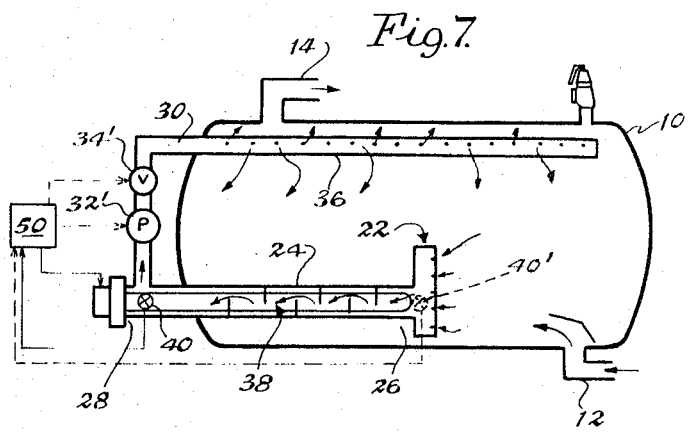

Reference is now made to FIG. 7, wherein the heating system of FIG. 1 is shown as being modified by incorporating same in a horizontally elongated tank 10. FIG. 7 also illustrates alternative control arrangements which may be employed in the practice of the present invention. A first such arrangement includes the provision of sensor 40, which is disposed adjacent the outlet end portion 28 of shroud 24 and employed to control operation of heater 38 in the manner described with reference to FIG. 11; and a constant displacement pump for circulating water through the heater. A second arrangement is suggested by the phantom line representation, wherein temperature sensor 40' is disposed adjacent the inlet end portion 26 of shroud 24 in order to sense the temperature of water before being passed into heat exchange relationship with heater 38. When sensor 40' is arranged in the manner illustrated, its output is preferably employed to control the rate of flow of water through shroud 24 and thus the rate at which heat is applied to such water, by adjustably controlling the operation of a variable capacity pump 32' or an adjustable flow control valve 34'. As will be obvious, it will also be desirable to employ the output of sensor 40' and/or sensor 40 to control energization of heater 38 in the manner discussed above. In this arrangement, the power or KW load supplied to heater 38 would be limited, as determined by controls within panel 50, to the available KW at any given time; adjustment of pump 32' or valve 34' serving at such time to vary the rate of flow relative to the heater to insure that water is brought up to its desired delivery temperature even when the heater is not fully energized.

Figure 8:
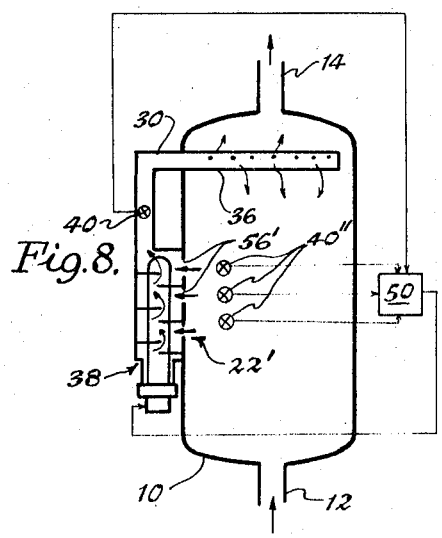

FIG. 8 illustrates a modified form of the present invention, wherein heater 38 is arranged within a manifold like enclosure 22' disposed exteriorly of tank 10 and placed in flow communication with different levels of the tank by tank wall openings 56'. Circulation of water through manifold 22' for discharge into the tank by sparger 36 is effected by convection.

FIG. 8 also illustrates an installation wherein anticipator temperature sensors 40'' are placed to sense the temperatures of water at different levels within the tank from which water is to be withdrawn by manifold 22'. The outputs of sensors 40'' are passed to panel 50 wherein they are "integrated" or "averaged" to produce a signal which will vary operation of heater 38, such operation being of course overcontrolled by sensor 40 arranged downstream of the heater. This arrangement permits the system to "anticipate" the power requirements of heater 38 to bring water passing upwardly through conduit 30 up to the desired withdrawal temperature, and thus provides for more uniform temperature control. This control arrangement may of course be incorporated in the several other systems described herein.

Figure 9:
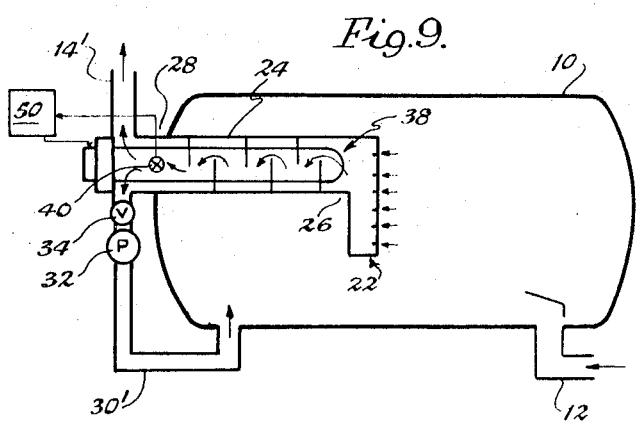

FIG. 9 illustrates a modified form of the present invention wherein water passing from heat exchange association with heater 38 is normally reintroduced into a lower level of tank 10 by conduit 30', but may be withdrawn to a point of use through an outlet 14'. Outlet 14' is arranged in flow communication with tank 10 through shroud 24 and manifold 22, and thus negates the need for previously described tank outlet 14. In this arrangement, manifold 22 compensates for the undesirable effects obtained from placement of shroud 24 in the upper portion of the tank and from the introduction of heated water into the lower level of the tank through conduit 30'; the placement of the shroud in this manner being dictated by installation and/or servicing considerations. In this respect, manifold 22 functions to fix hot water, which is normally present adjacent the top of tank 10, with relatively cold water present in the lower levels of the tank during both recovery and withdrawal periods. Thus, during a recovery period, manifold 22 normally serves to lower the temperature of water passed to heater 38, thereby forcing same to operate more efficiently, i.e. to have more of its heating elements energized, and thus reduce the period required to bring substantially all of the water within the tank up to a desired withdrawal temperature. During a withdrawal period, manifold 22 serves to mix previously heated water with the cold supply water entering through inlet 12 in order to prevent "gulps" or "slugs" of cold water from being passed to outlet 14' and otherwise insure that the temperature of water passing to heater 38 is smoothly reduced. As a result, water to be withdrawn is heated in a more uniform manner and the heater is operated more efficiently and without being subject to high instant load requirements.

Figure 10:
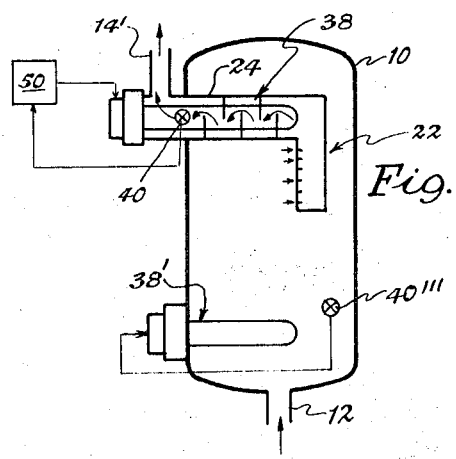

FIG. 10 illustrates yet another form of the present invention, wherein heater 38 is only employed when necessary to heat water being withdrawn from tank 10; water within the tank being brought up to a desired delivery temperature during a recovery period by unshrouded immersion heater 38'. Operation of heater 38' may be controlled in any conventional manner, as by temperature sensor 40''' arranged at a desired level within tank 10. As previously described, the mixing of water from levels within the tank at which different water temperatures may exist, makes for smoother and more efficient heater operation.

We claim:

1. A water heating system comprising in combination:

tank means for storing heated water for withdrawal to a point of use, said tank means having a cold water inlet to replenish water withdrawn therefrom;
conduit means communicating with the tank means;
heating means for heating water as it passes through said conduit means;
said conduit means having water intake means for delivering water from said tank means to pass in heat exchange relation with said heating means and further having heated water outlet means arranged in flow communication with said point of use, said conduit intake means including a vertically disposed intake manifold open to a plurality of levels within said tank means at which levels significantly different water temperatures may be expected to exist during operation, whereby the temperature of water passing into heat exchange relationship with said heating means is an integral of the temperatures of water from said plurality of levels; and
temperature sensing means responsive to the temperature of the water passing through the conduit means for controlling the rate of heat input thereto.

2. A system according to claim 1, wherein said temperature sensing means controls operation of said heating means.

3. A system according to claim 1, wherein said intake manifold has a plurality of water intake openings arranged in spaced relationship substantially throughout the vertical extent of said manifold.

4. A system according to claim 1, wherein said temperature sensing means is arranged to sense the temperature of water passing through said conduit after passing in heat exchange relation with said heating means.

5. A system according to claim 1, wherein said heating means is an electrically energized heater.

6. A system according to claim 5, wherein said heater includes a plurality of separately energizable heating elements, and said temperature sensing means progressively energizes individual ones of said heating elements in response to progressive changes in the temperature of the water passing through said conduit means.

7. A system according to claim 1, wherein said conduit means includes a substantially horizontally disposed shroud located at least partially within said tank means, said shroud having an intake end portion and an outlet end portion connected in flow communication with said conduit outlet means, said intake manifold having a plurality of vertically spaced water intake openings and an outlet opening, said outlet opening being connected in flow communication with said shroud intake end portion, and said heating means is an immersion heater arranged within said shroud.

8. A system according to claim 7 wherein said heater is an electrically energizable heater having a plurality of separately energizable heating elements, and said temperature sensing means progressively energizes individual ones of said heating elements in response to progressive changes in the temperature of the water passing through said conduit means.

9. A water heating system comprising in combination:
a tank for storing heated water;
means for withdrawing heated water from the tank;
means for supplying cold water to the tank to replenish water withdrawn therefrom;
conduit means having an inlet end portion and an outlet end portion communicating with the interior of the tank;
means for circulating water through the conduit means;
means for heating the water as it passes through the conduit means;
means responsive to the temperature of the water passing through the conduit means for regulating the rate of heat input thereto; and
means for dampening fluctuation in the temperature of the water passing through the conduit means, including a vertically disposed water intake manifold interposed between the inlet end portion of the conduit means and the interior of the tank and open to the tank interior at a plurality of levels therein at which significantly different water temperatures may be expected to exist during operation, whereby water from said levels is taken in concurrently by the manifold, combined therein and delivered to the inlet end portion of the conduit means at a temperature which is an integral of the different water temperatures at said levels for passage in heat exchange relation with the heating means.

10. A heating system according to claim 9, wherein said temperature responsive means controls operation of said heating means.

11. A heating system according to claim 9, wherein said water intake manifold is disposed within said tank and has intake openings arranged in spaced relationship substantially throughout the vertical extent thereof and a single outlet opening connected to the inlet end portion of the conduit means.

12. A heating system according to claim 9, wherein said conduit outlet end portion introduces water into said tank adjacent the upper end thereof.

13. A heating system according to claim 9, wherein said conduit means includes a substantially horizontally disposed shroud located at least partly within said tank, said water intake manifold is connected in flow communication with the inner end of the shroud, and said heating means is an immersion heater arranged within said shroud.

14. A heating system according to claim 13, wherein said heating means is an electrically energized heater having a plurality of separately energizable heating elements, and said temperature responsive means progressively energizes individual ones of said heating elements in response to progressive changes in the temperature of the water passing through said conduit means.

15. A heating system according to claim 14, wherein said water circulating means includes pump means for producing positive circulation of water through said conduit means.

16. A heating system according to claim 13, wherein said temperature responsive means is arranged to sense the temperature of water passing through said conduit means after passing in heat exchange relation with said immersion heater.

17. A heating system according to claim 9, wherein said water circulating means includes means for controlling the rate of flow of water passing therethrough, and said temperature responsive means controls operation of said flow rate control means.

18. A heating system according to claim 17, wherein said flow rate control means is a variable capacity water pump.

19. A heating system according to claim 17, wherein said flow rate control means is a water flow control valve.

20. A heating system according to claim 9, wherein said temperature responsive means is arranged to sense the temperature of water passing through said conduit means after passing in heat exchange relation with said heating means.

21. A heating system according to claim 9, wherein said temperature responsive means is arranged to sense the temperature of water before passing into heat exchange relation with said heating means.

22. In a water heating system including a tank for storing heated water, outlet means for withdrawing water from the tank, inlet means for supplying cold water to the tank to replenish withdrawn water, conduit means having an inlet end portion and an outlet end portion in communication with the tank, means for circulating water through the conduit means, and means for heating water passing through the conduit means, the improvement comprising:

means for dampening fluctuation in the temperature of the water passing through the conduit means, including a vertically disposed water intake manifold interposed between the inlet end portion of the conduit means and the interior of the tank and open to the tank interior at a plurality of levels therein at which significantly different water temperatures may be expected to exist during operation, whereby water from said plurality of levels is taken in concurrently by the manifold, combined therein and delivered to said conduit means at a temperature which is an integral of the different water temperatures at said levels; and means responsive to the temperature of the water passing through the conduit means for regulating the rate of heat input thereto.

23. A heating system according to claim 22 wherein said manifold is located within the tank and has a plurality of water intake openings arranged in spaced relationship substantially throughout the vertical extent thereof.

24. A water heating system including a water storage tank having a heated water outlet connection leading from an upper level thereof, and a cold water inlet connection into a lower level thereof, a water intake manifold having a series of water intake openings in communication with different levels of the interior of said tank and a single outlet opening, a conduit system having a water intake end portion connected in fluid communication with said manifold outlet opening, and its water outlet end portion delivering into the system adjacent said tank outlet connection, a regulatable output heater disposed in association with said conduit system for heating water therein, means causing circulation of water through said conduit system, and a temperature sensing device responsive to fluctuations in temperature of the water passing from said heater through said conduit system operable to regulate the operation of said heater whereby to deliver water through said conduit system at a desired temperature.

25. A water heating system as set forth in claim 24, wherein said intake manifold is located inside said tank.

26. A water heating system as set forth in claim 25, wherein said intake manifold comprises a vertically standing conduit having apertures through the side wall portion thereof at vertically spaced intervals therealong.

27. A water heating system as set forth in claim 26, wherein said intake manifold extends only throughout the lower elevation of the interior of said tank.

28. A water heating system as set forth in claim 26, wherein said conduit system outlet end portion comprises a horizontally extended perforated tube located inside said tank in the region of the uppermost level thereof.

29. A water heating system as set forth in claim 28, wherein said heater comprises an electric immersion type heater enclosed within an open-ended shroud defining a portion of said conduit system, and wherein said shroud includes staggered baffle means interiorly of said shroud causing the water passing therethrough to follow zig-zag paths in heat exchange relation with said heater.

30. A water heating system as set forth in claim 29, wherein said baffle means are arranged to cause the water to follow a vertically undulant path.

31. A water heating system as set forth in claim 29, wherein said baffles are arranged to cause the water to follow a horizontally undulant path.

32. A water heating system as set forth in claim 24, wherein there is provided a manually adjustable device for modulating the rate of flow of water through said conduit system.

33. A water heating system as set forth in claim 29, wherein said shroud extends at one end outside of said tank, and wherein said water circulation means comprises a pump, and wherein said conduit system includes piping leading in open communication from the outer end of said shroud through said pump and thence into said conduit system outlet end portion.

34. A system according to claim 1, wherein said water intake manifold has a plurality of water intake openings located at said different levels within the tank means and a single outlet opening.

35. A system according to claim 9, wherein said water intake manifold includes a plurality of vertically spaced intake openings and a single outlet opening, said outlet opening being connected to the inlet end portion of the conduit means.

36. A system according to claim 22, wherein said intake manifold includes a plurality of vertically spaced intake openings and a single outlet opening, said outlet opening being connected to the inlet end portion of said conduit means.

* * * * *